(12) United States Patent
Mulligan et al.

(10) Patent No.: US 12,528,524 B2
(45) Date of Patent: Jan. 20, 2026

(54) ELECTRIC-POWERED LOCOMOTIVE APPARATUS AND METHOD

(71) Applicant: Canadian Pacific Railway Company, Calgary (CA)

(72) Inventors: Kyle R. Mulligan, Calgary (CA); Gary Wong, Calgary (CA); Matthew Findlay, Calgary (CA); Milan Dubinsky, Calgary (CA); Veronika Kowalczyk, Calgary (CA); Minh Nguyen, Calgary (CA); Cody Fischer, Calgary (CA); Soon Chang, Calgary (CA)

(73) Assignee: Canadian Pacific Railway Company, Calgary (CA)

( * ) Notice: Subject to any disclaimer, the term of this patent is extended or adjusted under 35 U.S.C. 154(b) by 356 days.

(21) Appl. No.: 17/801,404

(22) PCT Filed: Aug. 19, 2022

(86) PCT No.: PCT/CA2022/051261
§ 371 (c)(1),
(2) Date: Aug. 22, 2022

(87) PCT Pub. No.: WO2023/164756
PCT Pub. Date: Sep. 7, 2023

(65) Prior Publication Data
US 2024/0239385 A1 Jul. 18, 2024

Related U.S. Application Data

(60) Provisional application No. 63/356,282, filed on Jun. 28, 2022, provisional application No. 63/315,369, filed on Mar. 1, 2022.

(51) Int. Cl.
*B60L 7/16* (2006.01)
*B61L 15/00* (2006.01)

(52) U.S. Cl.
CPC .............. *B61L 15/0058* (2024.01); *B60L 7/16* (2013.01); *B60L 2200/26* (2013.01); *B60L 2210/12* (2013.01); *B60L 2210/40* (2013.01)

(58) Field of Classification Search
CPC .... B61L 15/0058; B60L 7/16; B60L 2200/26; B60L 2210/12; B60L 2210/40;
(Continued)

(56) References Cited

U.S. PATENT DOCUMENTS

| 5,858,568 A | 1/1999 | Hsu et al. |
| 6,591,758 B2 | 7/2003 | Kumar |

(Continued)

FOREIGN PATENT DOCUMENTS

| CN | 102424004 B | 12/2013 |
| CN | 107244326 A | 10/2017 |

(Continued)

OTHER PUBLICATIONS https://www.airbus.com/newsroom/news/en/2020/10/hydrogen-fuel-cell-cross-industry-collaboration-potential-for-aviation.html.

*Primary Examiner* — Scott A Browne
*Assistant Examiner* — Terry C Buse
(74) *Attorney, Agent, or Firm* — Bennett Jones LLP

(57) ABSTRACT

A locomotive has DC or AC traction motors, powered by a hydrogen fuel cell, and optionally other sources such as regenerative braking. The traction motors of the locomotive may be connected to a set of independent DC choppers or AC inverters, linked via a common DC bus, configured to regulate power from the one or more power sources. A manager module, among other functions, may receive inputs and signals to coordinate delivery of electricity from the sources to the motor. A method for retrofitting a legacy locomotive may include removing a generator and a control apparatus configured for diesel fuel, and installing a kit of (Continued)

apparatus configured to be powered by a hydrogen fuel cell. A railway system for use by locomotives powered by hydrogen has one or more hydrogen-generation stations deployed near a track of the railway system.

24 Claims, 10 Drawing Sheets

(58) Field of Classification Search
CPC .... B60L 1/003; B60L 7/14; B60L 7/22; B60L 50/51; Y02T 10/70
See application file for complete search history.

(56) References Cited

U.S. PATENT DOCUMENTS

| | | | |
|---|---|---|---|
| 7,124,691 B2 * | 10/2006 | Donnelly | B60L 53/14 105/26.05 |
| 7,304,445 B2 | 12/2007 | Donnelly | |
| 7,518,254 B2 | 4/2009 | Donnelly et al. | |
| 7,740,092 B2 | 6/2010 | Bender | |
| 7,791,915 B2 | 9/2010 | Chatroux et al. | |
| 7,906,862 B2 | 3/2011 | Donnelly et al. | |
| 7,944,081 B2 | 5/2011 | Donnelly et al. | |
| 8,220,572 B2 | 7/2012 | Donnelly | |
| 8,836,289 B2 | 9/2014 | Flett | |
| 9,296,300 B2 | 3/2016 | Kumar | |
| 10,666,058 B2 | 5/2020 | Ballantine et al. | |
| 10,899,369 B2 * | 1/2021 | Shooter | B61F 1/00 |
| 11,894,539 B2 * | 2/2024 | Soles | B60L 58/40 |
| 2006/0266255 A1 * | 11/2006 | Donnelly | B60L 50/30 105/61 |
| 2018/0237037 A1 | 8/2018 | Shooter | |
| 2021/0139054 A1 * | 5/2021 | Kumar | B61C 17/12 |

FOREIGN PATENT DOCUMENTS

| | | | | |
|---|---|---|---|---|
| CN | 107444143 A | | 12/2017 | |
| CN | 105790317 B | | 4/2019 | |
| CN | 112406566 A | | 2/2021 | |
| CN | 113014118 A | * | 6/2021 | ............... H05K 7/02 |
| CN | 113809360 A | | 12/2021 | |
| EP | 1923288 B1 | | 8/2010 | |
| WO | 2012095595 A2 | | 7/2012 | |
| WO | 2019175850 A1 | | 9/2019 | |
| WO | 2021064010 A1 | | 4/2021 | |

* cited by examiner

Battery Pack

Battery Pod Assembly

ELECTRIC-POWERED LOCOMOTIVE APPARATUS AND METHOD

BENEFIT OF EARLIER APPLICATIONS

This application claims priority from U.S. provisional application 63/315,369, filed Mar. 1, 2022, and U.S. provisional application 63/356,282, filed Jun. 28, 2022.

TECHNICAL FIELD

The present invention relates to locomotives in general, and electric-powered locomotive apparatus and methods in particular.

BACKGROUND

There is a demand for an electric powered locomotive that may use a hydrogen fuel cell, and a method for retrofitting a legacy locomotive to be an electric powered locomotive that may use a hydrogen fuel cell.

PRIOR ART

U.S. Pat. No. 8,117,969 to Miller et al. discloses a hydrogen fuel cell hybrid locomotive. U.S. Pat. No. 7,304,445 B2 to Donnelly discloses a locomotive power train architecture.

A trip optimizer algorithm known in the prior art may include the following:
(a) Business to Business (B2B) feed of the train make-up details;
(b) Railroad track profiles (elevation, curvature); and
(c) GPS location to align the train with the profile.

The system may be initialized at the beginning of a trip. The system optimizes the route to determine the time and location required in each throttle notch. The optimization is based on the individual train tonnage and configuration. The train may be operated per the plan, which may be recalculated based on, or in response to, changing conditions and/or new information. The system does not necessarily use a feed forward approach to idle the locomotive or reduce speed to save fuel. The system does not necessarily look at current conditions of the locomotive to make any sort of feed forward determination because there is only a single fuel type. The system's goal and/or utility, in one aspect, may be characterized as to maintain track speed, and does not necessarily require speed as an input to determine the power source to be used. The system does not necessarily use state of charge of any batteries, remaining fuel (e.g., hydrogen or otherwise), or upcoming location terrain to assess which system will primarily supply power. If insufficient power cannot be produced, the system does not have the ability to reduce train speed to get to the next area where battery or hydrogen charge might be restored.

SUMMARY OF INVENTION

In accordance with a broad aspect of the present invention, there is provided a locomotive, comprising: a traction motor, being powered by electricity from one or more power sources, including a hydrogen fuel cell, and optionally a battery and a regenerative braking apparatus, the motor being operatively connected to a set of independent DC choppers; each of the choppers being linked via a common DC bus, the bus connecting the power source to each DC chopper and the motor; each DC chopper being configured to regulate power to the traction motor; a converter for regulating a voltage of the bus; a user interface for communication with an operator; and a manager module, including a processor, configured to receive an input from the user interface and send signals thereto; control the converter; coordinate delivery of electricity from the one or more power sources to the motor, including determining an amount of power delivered by each of the one or more power sources, and deciding which power source to use as a single source or multiple sources, based on one or more inputs, including available power of each source; and modulate regenerative braking based on one or more of a speed, a consist, a wheel slippage indicator, a track profile, and an operator signal.

In accordance with another broad aspect of the present invention, there is provided a method for retrofitting a locomotive, comprising: removing a generator and a control apparatus, each being configured for diesel fuel; and installing one or more power sources, including a hydrogen fuel cell, and optionally a battery and a regenerative braking apparatus, a set of independent DC choppers linked via a common DC bus, a converter, a user interface, and a manager module; and coupling the one or more power sources to the one or more choppers via the common bus.

In accordance with yet another broad aspect of the present invention, there is provided a kit for retrofitting a locomotive, wherein the locomotive originally comprised a diesel-fueled generator to power a traction motor, the kit comprising: a lift-in, pre-fabricated assembly for installation onto a chassis of the locomotive, the assembly including a traction motor, one or more power sources, including a hydrogen fuel cell, and optionally a battery and a regenerative braking apparatus, a set of independent DC choppers linked via a common DC bus, a converter, a user interface, and a manager module.

In accordance with yet another broad aspect of the present invention, there is provided a railway system for use by locomotives powered by electricity from a hydrogen fuel cell, comprising: a track of a railway, a plurality of hydrogen-generation stations deployed near the track of the railway system positioned at locations that are accessible by the locomotives, for refueling of the locomotives, where the locations are optimized for station inputs and optimal operation expected of the hydrogen fueled locomotives.

In accordance with yet another broad aspect, there is provided a method for retrofitting a locomotive, the locomotive including a traction motor for a wheel set powered at least in part by a diesel engine and an alternator supported by a diesel fuel tank, the method comprising: removing the diesel fuel tank, installing batteries in a space vacated by removal of the diesel fuel tank, removing the diesel engine and the alternator from above a deck/platform of the locomotive, installing fuel cells and hydrogen cylinders on the deck in an area vacated by removal of the diesel engine and the alternator, and coupling the batteries and the fuel cells to the traction motor and to a cab of the locomotive.

It is to be understood that other aspects of the present invention will become readily apparent to those skilled in the art from the following detailed description, wherein various embodiments of the invention are shown and described by way of illustration. As will be realized, the invention is capable of other and different embodiments and its several details are capable of modification in various other respects, all within the present invention. Furthermore, the various embodiments described may be combined, mutatis mutandis, with other embodiments described herein.

Accordingly, the drawings and detailed description are to be regarded as illustrative in nature and not as restrictive.

BRIEF DESCRIPTION OF THE DRAWINGS

Referring to the drawings, several aspects of the present invention are illustrated by way of example, and not by way of limitation, in detail in the figures, wherein.

DETAILED DESCRIPTION OF EMBODIMENTS

The detailed description set forth below in connection with the appended drawings is intended as a description of various embodiments of the present invention and is not intended to represent the only embodiments contemplated by the inventor. The detailed description includes specific details for the purpose of providing a comprehensive understanding of the present invention. However, it will be apparent to those skilled in the art that the present invention may be practiced without these specific details.

A hydrogen locomotive for use on railways may be a retrofitted locomotive which may originally have used a diesel fueled generator to power electric traction motors through an alternator. Such original locomotives may be referred to in the industry as diesel-electric locomotives. A hydrogen locomotive may be made by replacing the diesel generator with, for example, a combination of hydrogen fuel cells and batteries to power the original traction motors. The original traction motors are sometimes direct current (DC) traction motors, for example on line-haul (freight) locomotives. The power may be supplied through a set of independent DC choppers linked through a common DC link/bus.

Figure 2:
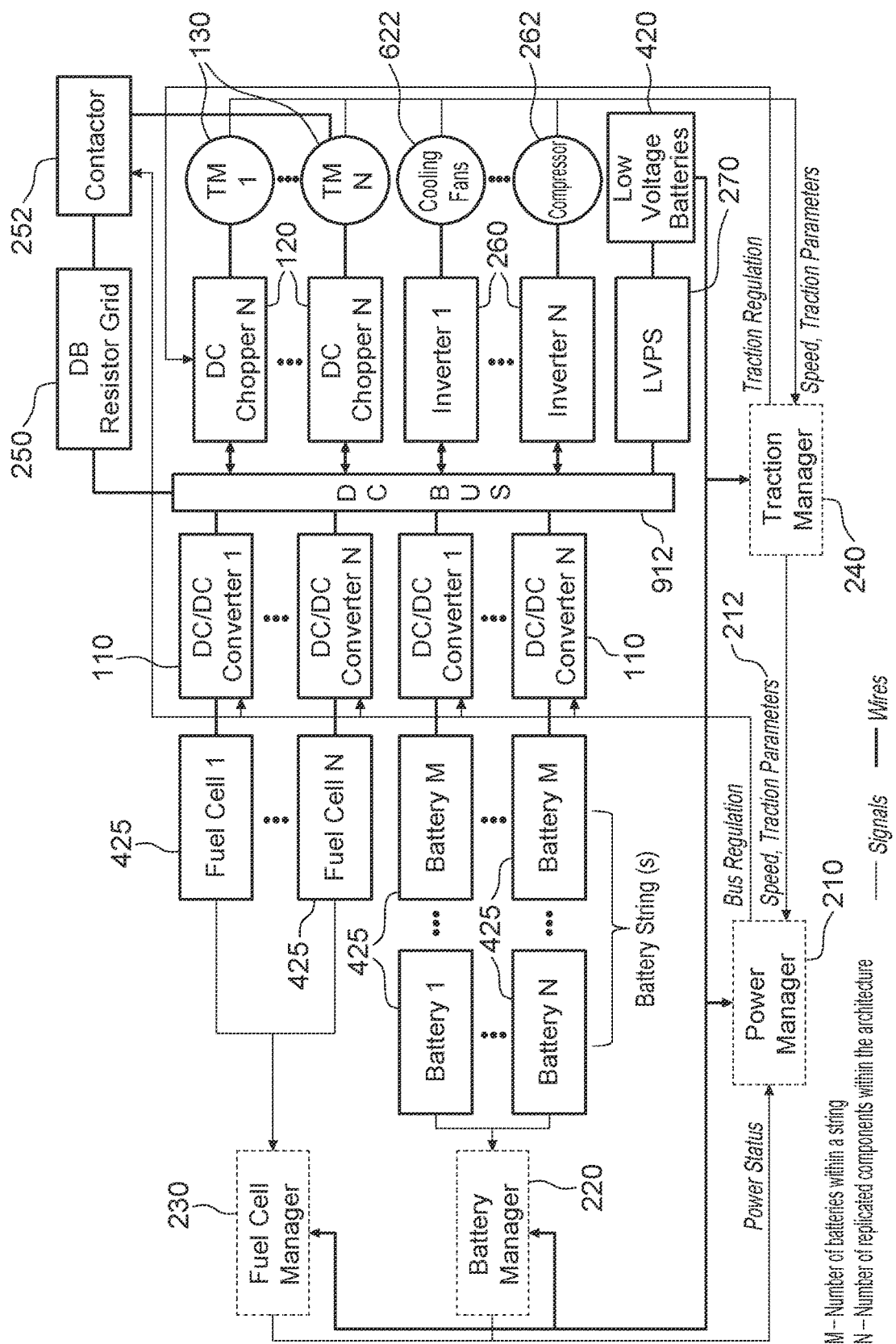
FIG. 2 is a schematic of a locomotive, illustrating a traction/recharging architecture showing a fuel cell, battery, traction, and locomotive manager module (including power managers), according to one embodiment.

The common DC bus connects the power generation (e.g., one or more hydrogen fuel cells and/or batteries) to the independent DC choppers, which regulate the generated power to the DC traction motors. The DC bus voltage generated by the fuel cells and batteries is regulated by DC/DC converters controlled through a manager module 200 (FIG. 2), which may include a power manager sub-module, the modulation being dependent on or responsive to a series of states (e.g. wheel traction, regenerative braking, battery charge and discharge rate, fuel on-board, etc.).

Although locomotives are used as an illustrative example, it is to be appreciated that other applications, such as marine, heavy mining trucks, and military apparatus, may use the hydrogen electric power systems described herein without departing from the present invention.

In one embodiment, the retrofitting method may be applied to other types of locomotives, such that, for example: a DC switcher locomotive is provided, which may use a similar DC traction motor platform to the hydrogen locomotive described above; or a line-haul locomotive may use alternating current (AC) traction motors. Each of these embodiments (i.e., DC line-haul, DC switcher, AC line-haul) can leverage a common DC bus. For AC locomotives, inverters, or DC to AC converters, are used to convert power to be inputted into the AC traction motors. Therefore, the development of a modular DC architecture into a common DC bus can be leveraged across various locomotive types.

For retrofitting conversion processes, the architecture of zero-emissions locomotives may be modularized. This presents significant opportunities to reduce costs of the conversion process by grouping components into assemblies which can be fabricated on a shop floor in production and then outfitted onto the existing locomotive platform/chassis. The consolidation of the assemblies into modularized production conversion kits is the basis for an embodiment of the present modernization method to low- or zero-emission hydrogen fuel-cell powered locomotives. In one embodiment, a production zero-emission conversion package for diesel-electric locomotives is provided.

Mechanical and Electrical Component Modularization

Figure 4A:
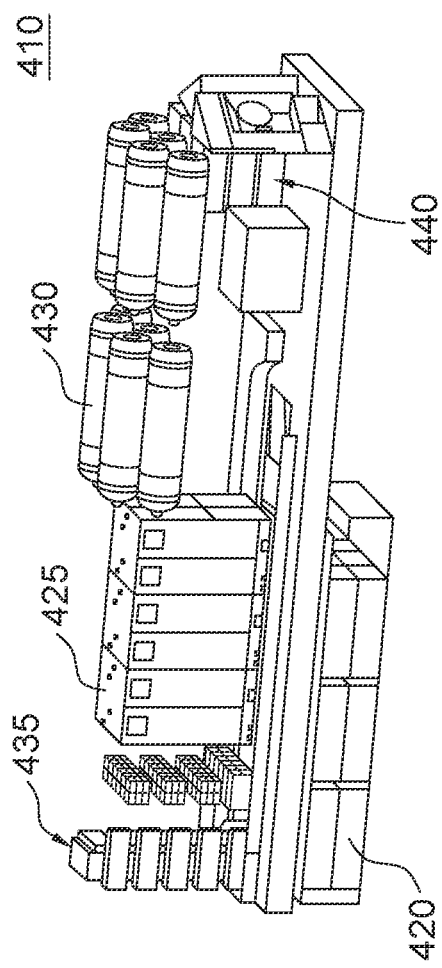
FIG. 4A and FIG. 4B are diagrams illustrating removal and replacement of components as part of a retrofit of a legacy locomotive, according to one embodiment.
Figure 4B:
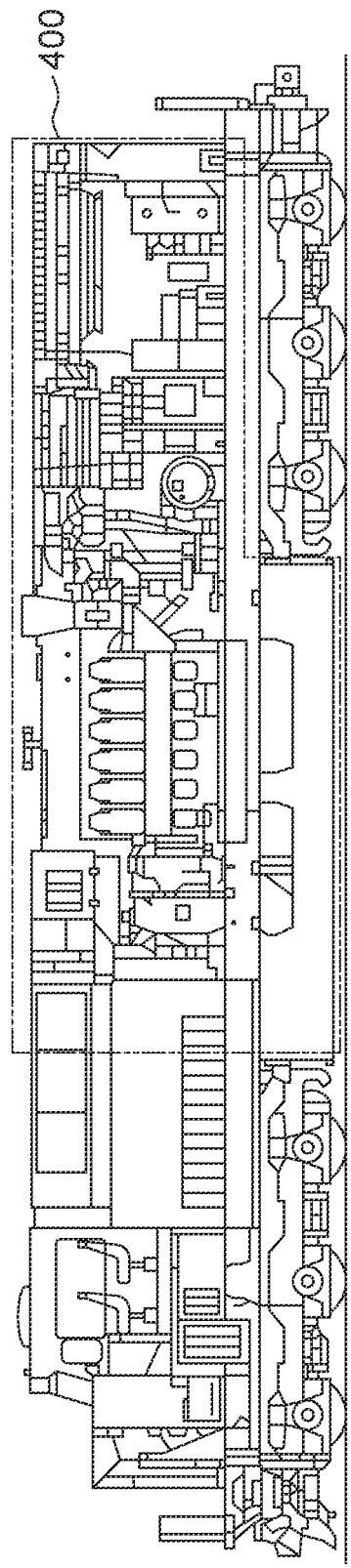

Converting a diesel locomotive to use fuel cells and batteries requires the removal of the existing diesel engine and alternator and removal of the fuel tank. Removal of the diesel engine may also include removal of the cooling systems and oil supply. An example of the components 400 requiring removal is shown in FIG. 4A, and an example of replacement components 410 is shown in FIG. 4B.

All other components including, but not limited to the locomotive: cab (control stand, event recorder, lighting, seating, radio, and/or wiring), electrical locker, traction motors, trucks, compressor, frame, and many other components can remain intact during and after the conversion process. Of course, optionally, one or more of such components may also be removed, upgraded, or replaced during the conversion.

Removal of the fuel tank results in a vacated, open space below the locomotive chassis base platform, generally centrally on the locomotive between two spaced apart axles. The existing diesel engine and alternator are generally positioned above, for example are supported on, the locomotive chassis base platform. Removal of the existing diesel engine and alternator, therefore leaves an open space on the locomotive chassis base platform.

The conversion process installs batteries 420 into the space vacated by removal of the fuel tank, which is below the locomotive chassis base platform. The weight of the batteries is, therefore, accommodated low on the locomotive and can be positioned to distribute the weight evenly between the sides. This configuration positions the batteries so that they are also readily accessible. For example, the battery installation may include circuitry, for example resistors, that are accessible for service from a side panel of the locomotive. The batteries may be the traction motor batteries and related systems.

Fuel cells 425 and hydrogen ($H_2$) fuel storage tanks 430 can be installed in the space vacated by removal of the diesel engine and alternator. This positions the fuel cells and hydrogen storage tanks above and supported on the locomotive chassis base platform. In addition to the fuel cells and hydrogen storage tanks, other components installed above the platform may include an electrical locker 435, fuel cell cooling system and auxiliary battery systems 440. The heavy items can be positioned to distribute the weight evenly between the sides of the locomotive. For example, the hydrogen fuel tanks can be installed to be evenly distributed between the sides and nearer the rear of the locomotive frame, over the rear wheel sets. The cooling system, including the fans and radiator, can be constructed in a planar configuration to overlie the footprint of the installation.

The retrofit solution requires minimal preparation and enables most of the locomotive and existing on-board systems to remain intact.

Figure 5:
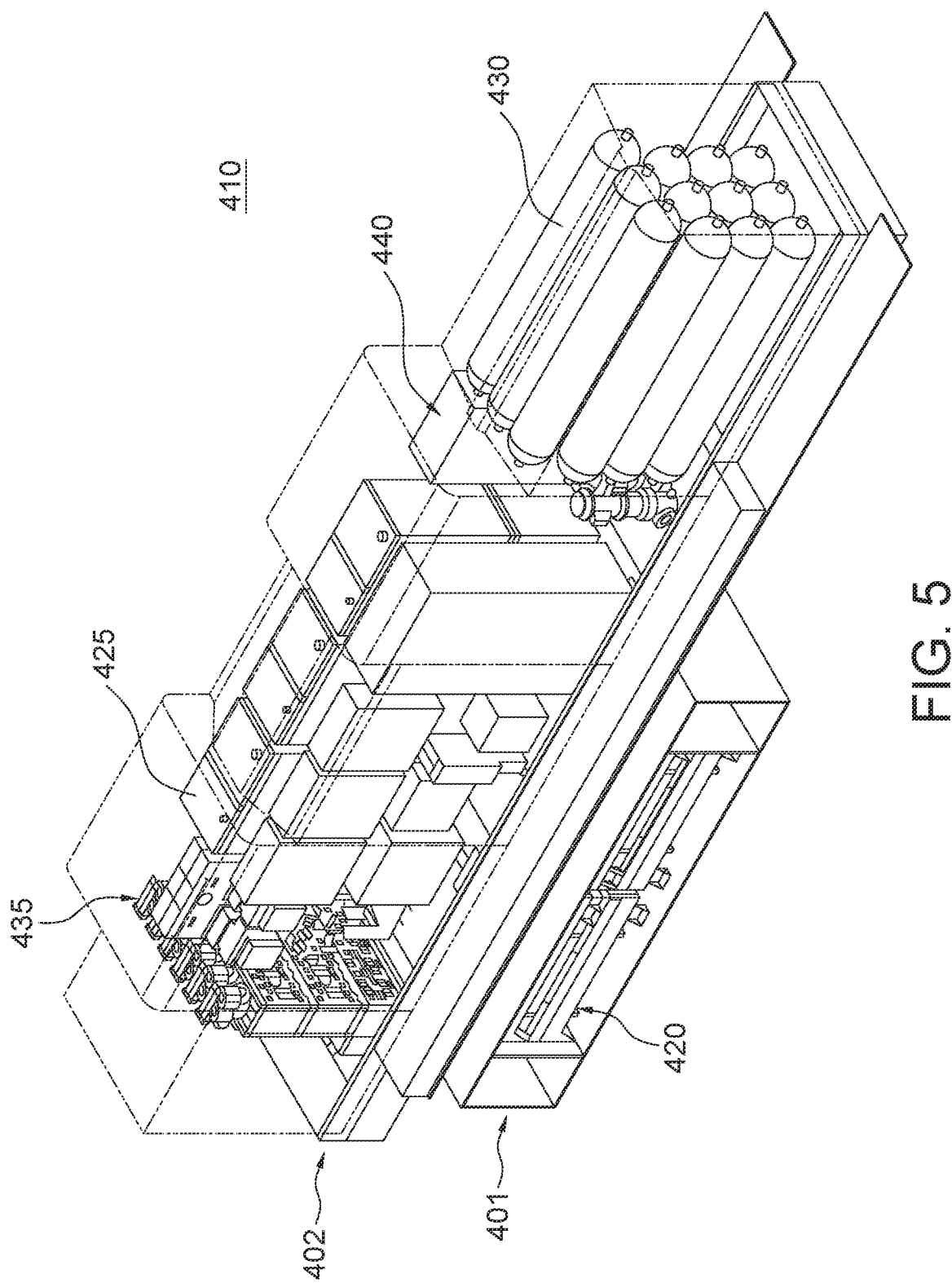
FIG. 5 is a top perspective view of a modular layout for a traction battery system, including an electrical locker, fuel cells, hydrogen storage, and auxiliary battery systems, of a locomotive according to one embodiment.

In one embodiment, there may be two modular assemblies for refitting an existing diesel-electrical locomotive to a hydrogen locomotive. Once the diesel engine, alternator and fuel tank are removed, the two modular assemblies can be attached to the locomotive chassis/platform to complete the conversion process. With reference to FIGS. 4A, 4B, and 5, one modular assembly, a lower modular system 401, may include the batteries 420, such as the traction battery system, for example, configured as a box. The other modular assembly, termed herein an upper modular system 402, may include: the fuel cells 425 and hydrogen storage 430, and possibly also the electrical locker 435, and auxiliary battery systems 440. These modular assemblies can be built and assembled on a shop floor, and installed nearby or shipped to a different location for a conversion process off site. There are various possible layouts.

Figure 6:
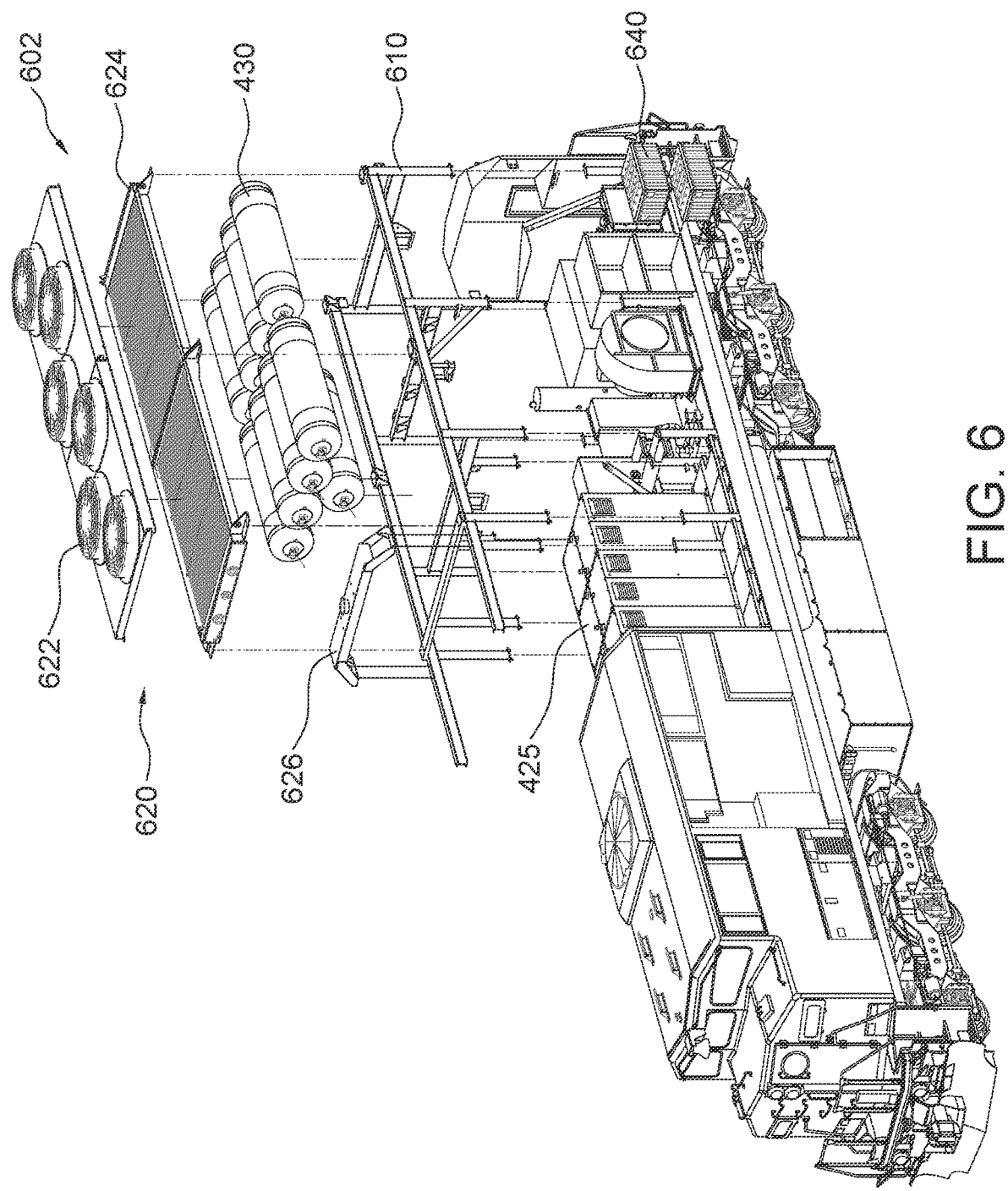
FIG. 6 is a top, perspective, partially exploded view of a modular design of a locomotive, according to one embodiment, including cooling fans, a radiator, hydrogen cylinders, expansion tank, and rack assemblies, in which the assembly may bolt or otherwise couple to steel stanchions, which may be welded or otherwise coupled to a pre-existing locomotive frame.

FIG. 6 illustrates an example of a portion of an upper modular assembly 602 useful for retrofitting a hydrogen locomotive. The illustrated upper modular assembly portion includes an equipment rack assembly 610 of the modular assembly for supporting fuel tanks 430 and a liquid cooling system 620 including fans 622, radiator 624 and glycol expansion tank 626. The rack assembly couples, e.g., via bolts, to steel stanchions, which may be coupled, e.g., welded, to the existing locomotive frame. The entire illustrated assembly may be positioned adjacent to the locomotive on the shop floor, or in fact anywhere, and may be hoisted onto the locomotive for coupling thereto.

Other elements may be installed below the rack including for example, the auxiliary batteries 640, as shown, fuel cells 425 and electrical locker.

The retrofit may also install a traction motor blower, wiring, and associated electrical components (e.g., inverters, chokes), which may be mounted to one of the modular assemblies, for example the upper modular assembly.

In one embodiment, locomotive retrofit may leverage a structure similar to an intermodal container (e.g., a C can) to house the various components, which can be hoisted onto the locomotive frame and coupled, e.g., welded and/or bolted into place as the upper modular assembly.

After installations of the batteries below the platform and fuel cells, etc. above the platform, possibly by use of modular assemblies, various interconnects between the batteries below the platform and the fuel cells, etc. are made and various interconnects are made between new and existing systems. For example, an electrical coupling can be made between the batteries and fuel cells and electrical and control couplings can be made from the installed components to the cab and to the traction motors. In one embodiment, the electrical coupling between the batteries and fuel cells may include a bus configuration.

The various components (or subsets thereof) may be connected using any suitable connector. However, in one embodiment configurations are employed to avoid magnetic issues. For example, fibre optic cables may be employed to avoid magnetic issues, as the complex wiring may cause a magnetic field that could interfere with operation or deteriorate components. Further or in the alternative, a magnetic shield may be included to avoid or mitigate such issues. Further or in the alternative, power cables may extend substantially perpendicular to communications cables.

The retrofitting solution also presents the opportunity to scale up the conversion process into a production environment, which may give rise to economies of scale. Locomotive modernizations are likely to cost up to 50% less than purchasing a new locomotive.

In one embodiment, therefore, a low- or zero-emission conversion package for diesel-electric locomotives is provided which may include two or more modularized components. The first component may be configured for replacing the fuel tank with a battery box. The second component may be for replacing the top platform components (e.g., engine and alternator, and possibly cooling system, and/or oil supply) with an assembly containing one or more components, such as: fuel cells, gas cylinders, cooling fans, radiators, inverters, compressors 262, DC/DC converters, cooling tanks, and/or expansion tanks. The battery box and top platform assembly can be coupled, e.g., welded or bolted, to the existing locomotive frame. The battery box may be installed first, and connected to the top platform assembly via a shared DC bus. The locomotive's electrical cabinet contactors, possibly all or some from the existing locomotive systems, may then be wired to the shared DC bus. These contactors may be controlled through existing locomotive terminal boards, which enables the existing locomotive systems and subsystems (e.g., lighting, radio, control stand, air and/or brake rack) to remain in place and to be powered.

DC Bus Architecture

Zero emissions technologies such as, but not limited to, fuels cells and batteries, produce electrical energy in the form of direct current. Increasing power outputs and capacity can be accomplished by linking increasing quantities of these devices through a common bus 912.

Devices which require power can also be attached to the common bus. Additional components such as, but not limited to: DC/DC converters 110, inverters 260, choppers, contacts, fuses, and breakers are used to regulate and tune the power supply 270 based on component specifications and limitations. One or more of such components may be coupled between the power source(s) and the DC bus (on the supply side) and/or on the traction (demand) side between the bus and consumer/DC traction motor(s). In one embodiment, DC choppers may be used for regulating DC voltage from the DC link to the DC traction motors. DC choppers 120 may drive efficiencies, and can regulate DC link power into traction motors 130 avoiding electrical anomalies, such as transient voltages. The control of each traction motor 130 using a dedicated chopper 120 also enables individual axle/wheel set control. This permits, for example, cut-out of traction motors which have experienced an electrical or other failure such that the locomotive can continue in-service. Methods and apparatus using common DC power train architecture that include choppers may be used. DC choppers may power a traction motor 130 using a common DC link 912. For AC traction, the concept is the same except instead of DC choppers, inverters or DC to AC converters may power a traction motor using a common DC link.

Figure 1:
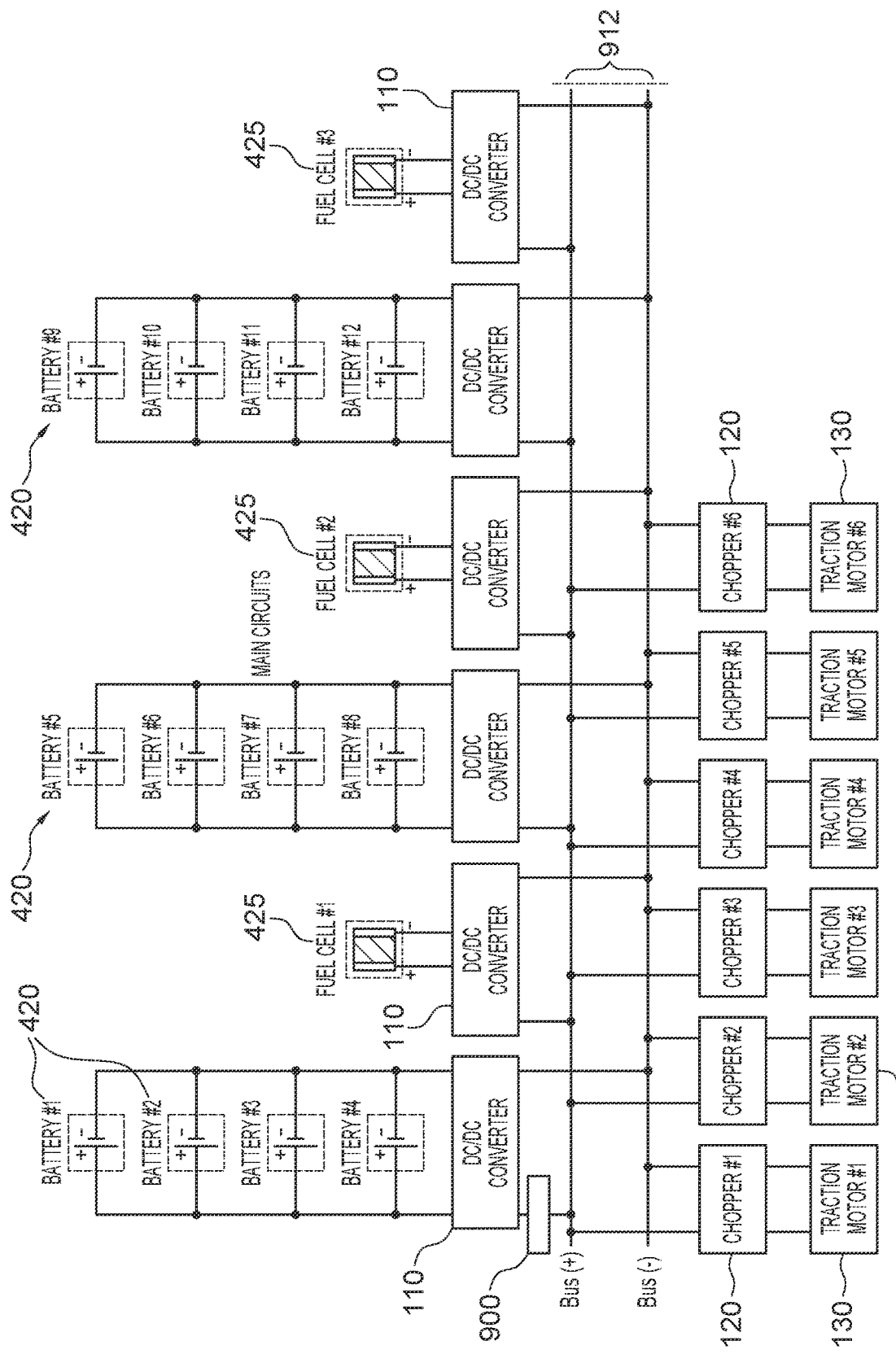
FIG. 1 is an electrical architecture diagram of a locomotive, illustrating fuel cells and batteries connected through a common DC link/bus to traction motors, according to one embodiment.

One embodiment of the architecture used in a DC hydrogen locomotive demonstrator is shown in FIG. 1. The top of the figure contains the electrical inputs (in the illustrated embodiment, fuel cells 425 and batteries 420). Each electrical input may be connected to a DC/DC converter 110, which may allow electrical regulation onto and protection from the DC link 912. The bottom of the figure shows the DC choppers 120 operatively connected between each traction motor 130 and the common DC link 912.

Manager Module

A locomotive manager of the invention may use operator controls and speed as inputs to regulate power onto a common DC link or bus through different control system cases. For higher speeds, once the locomotive reaches a pre-determined threshold speed, the power manager may boost DC link voltage using only fuel cell outputs to enable the locomotive to reach higher track speeds. This may reduce the number of batteries required in series within a string to meet DC link voltage requirements. The design decision may also be based on a duty cycle analysis, which may use locomotive event recorder data to determine how often higher track speeds, such as above 50 MPH (80 km/h), are used. To achieve such track speed, fuel cell power may be used exclusively to elevate the DC common bus link voltage. During this time, the batteries may remain in a charging state. Below the threshold speed (for example below 50 MPH), the batteries may be the primary power source to the DC link and the fuels cells may be activated intermittently to recharge the batteries. This approach may also save hydrogen fuel, which extends the self-contained range of the locomotive.

A regenerative braking system may use a combination of resistor grids and a chopper to balance recharging and braking effort based on speed and operator inputs. An operator also has an option to manually bypass regenerative braking based on required operational braking demands (e.g. for trains with higher tonnages). Braking effort may increase by increasing the amount of load passed through the resistor grids. Increasing braking demand by passing more power through the resistor grids can also be done automatically by the power manager based on the operator notch input (e.g., higher notches may mean the operator requires more braking, and the power manager may automatically recognize same and adjust in this situation to favor braking and heat dissipation from the resistor grids over redirecting power for battery recharging).

A power manager 210 (FIG. 2) may receive and consider data including data related to track, consist, tonnage, and duty cycle inputs. The power manager may use a feed forward logic to optimize recharging locations and determine when hydrogen fuel consumption is more efficient based on the upcoming network geography and track profile, whereby known or predicted regenerative locations may exist. Delayed battery recharging from hydrogen fuel cell activation by taking advantage of regenerative braking opportunities in the track profile, may save hydrogen fuel supply.

The manager module may include one or more sub-modules, which may be distinct or integral. For example, the manager module may include a power module 210, which may include a DC/DC converter 110. The DC/DC converters may be controlled by a programmable logic controller (PLC) as part of the architecture shown in FIG. 2. The power manager may monitor each respective manager for each subsystem (e.g., battery manager 220, fuel cell manager 230, and/or traction, regenerative braking systems 240). The power manager 210 may accept locomotive control and speed inputs 212 to listen to the state of the locomotive. The locomotive state recognized by the power manager may determine the power requirements from the batteries, fuel cells for traction or the amount of power provided to the DC bus by regulating power which is balanced through and around resistor grids 250 using contactors 252 or any other control switch or circuit during regenerative braking. Locomotive control inputs 212 to recognize the state of the locomotive (e.g., traction, braking) include, but are not limited to: the reverser position, throttle notch, dynamic brake notch. Locomotive speed may be captured to determine if the fuel cells must elevate the DC link voltage to meet track speed. At higher speeds more voltage is required which may be beyond the capabilities of the batteries alone, versus lower speeds where more current is often required to accelerate the locomotive.

Other inputs the power manager may receive and use include, for example, track profile, GPS location, refueling locations and/or other location information. As an example, if the track profile may indicate an impending descending grade, the power manager can determine if there is sufficient power to reach that location using GPS to determine present location with respect to the grade. If sufficient power exists, the power manager may mitigate starting the fuel cell and using hydrogen reserves because the required energy can be generated and/or captured via regenerative braking, which may be performed using a regenerative braking apparatus. Conversely, if the locomotive is approaching an ascending grade, the power manager may choose to use both fuel cell and battery power to ensure sufficient energy is available to ascend the grade. Track profile and GPS or other location information therefore enable the power manager to optimize the distribution of power and overall use of hydrogen reserves.

Determining the amount of power delivered by each power source, (e.g., the battery, regenerative braking and the hydrogen fuel cell) may depend on a number of factors, and may give rise to a number of possible decisions. For example, the power manager may make such analysis by receiving data from each power source, and may determine a primary and/or sole source of power, or that a blend of multiple sources is to be used, and at which rates. A substantially constant voltage may be maintained. How many sources contribute to that voltage may depend in part on the capacity of each source. For example, if the battery is depleted beyond a selected threshold, such as 80%, the manager may cause the fuel cells to power the locomotive and/or charge the batteries.

Unlike embodiments of the prior art, the power manager does not require a B2B or back-office feed for operation, and can operate independently via onboard equipment. For example, it may simply input specific fuel saving locations from an onboard data store.

Based on proximity to these locations and available power, the power manager can decide which power source can be leveraged to optimize hydrogen consumption and reduce speed in order to stretch range. If an upcoming regenerative location can be leveraged, the power manager may choose to reduce speed to reach this location. The optimization can be refined with each trip based on past trip performance, with equipment on-board. Train consist can be inputted manually, through a back office, or using OCR recognition from train paperwork, or a wireless link with crew tablets, or by any other means.

Power manager scenarios can include, but are not limited to:

(a) Battery Traction Case 310: Use fuel cells to recharge batteries only and batteries are main traction energy source (low to medium speed cruising);
(b) Fuel Cell Traction Case 320: Use fuel cells to recharge batteries and fuel cells are main traction energy source (high speed cruising);
(c) Pro-Active Regenerative Case 330: Use regenerative braking instead of fuel cell power (impending descending grade);
(d) Regenerative Braking Case 340: Use dynamic braking energy to recharge batteries on a descending grade;
(e) Pro-Active Energy Case 350: Use fuel cells and batteries to ensure energy availability (impending ascending grade); and
(f) Manual Case 360: Engineer requires fuel power and overrides control system with a manual switch on the control stand.

Optionally, the operator can override the optimization decision of the power manager module using a switch on the locomotive control stand in the event more power is required or as operating demands change.

The manager module may be configured to implement a learning algorithm to optimize power consumption based on past trip data including one or more of location, distance travelled, track profile, operator preference, consist, minimum speed, time, and power consumed by each of the power sources. The manager module may update the past trip data after a trip using measurements obtained during the trip. Such data may be shared with a network and/or with other locomotives. In one aspect, the manager module may use data of trips taken by the instant locomotive or any other locomotive and implement a machine learning method thereon, to optimize trips for the instant locomotive and/or any number of other locomotives. Such data can be transferred automatically in real time, for example, via the internet, or manually, for example, via exchange of a portable storage medium.

Electrical Architecture

Most off-the-shelf electrical components for zero-emission technologies available today do not support the higher voltages required for locomotives. These components are built mainly to support the current demands of the automotive industry. Based on the duty cycle analysis of industry locomotives, most of the time 800V is sufficient based on the average speeds and energy requirements. In one embodiment, a minimum voltage restraint may be provided, for example a minimum voltage of 200V. However, to meet higher track speeds expected of locomotives, DC locomotive traction motors require voltages over 900V, for example over 1000V, whereas the current off-the-shelf electrical converters support mainly 800V or lower, for example up to 700V. Furthermore, most battery manufacturers only permit a fixed amount of batteries to be placed and managed in series. Therefore, the total output of a battery string (set of batteries in series) is often limited to a range between 750V to 950V (for example, 800V to 900V) as well.

Figure 10A:
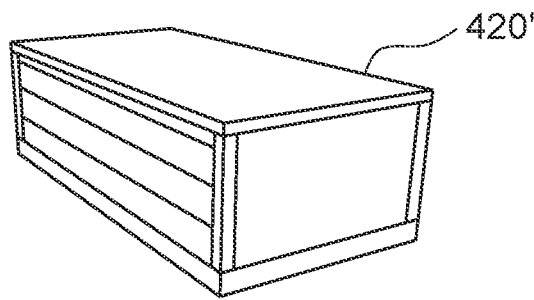
FIG. 10A and FIG. 10B are perspective views of an example battery and an example battery pod, respectively, each useful in the invention.
Figure 10B:
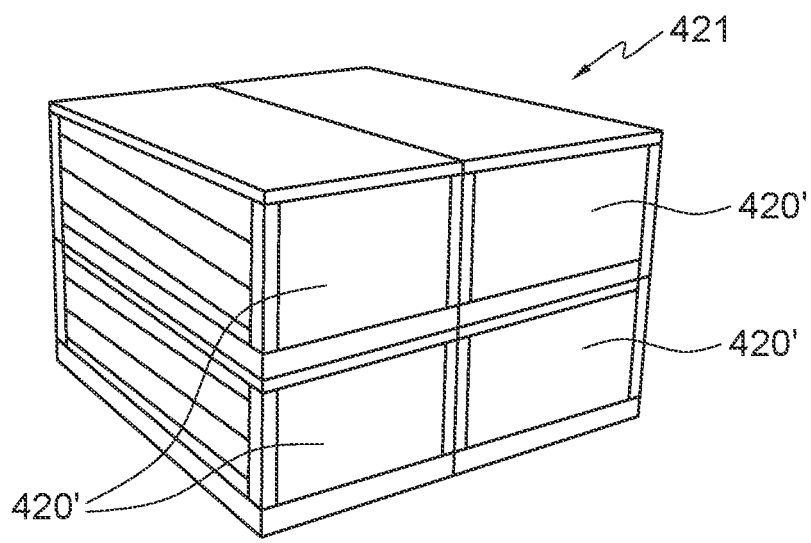

With reference to FIG. 10A, in one embodiment, batteries (an example battery 420' is shown on the left, which is FIG. 10A) may be arranged as pods (an example pod 421 with four batteries 420' is shown on the right, FIG. 10B). Each pod may have one or more batteries, including, for example, 24 batteries. Each pod may have the same number of batteries, or the pods may have varying numbers of batteries. The number of batteries in a pod, and the number of pods, can be selected based on various factors, including power demands, hydrogen cell output, the number of the given type(s) of batteries that can be strung together, supply chain constraints, available physical space of the locomotive, etc. The locomotive may include one or more pods, including, for example, six pods. The pods may be coupled to a battery bus, and the battery bus may be coupled to the common DC bus. In one embodiment, the pod may have a voltage of over 800V, including, for example, approximately 876V, and further including, for example, up to 1500V, comprising multiple batteries arranged in series. Batteries may be prearranged as pods, thereby facilitating assembly by avoiding the need to arrange batteries into pods during assembly of the locomotive.

Fuel cells and associated components can offer the required voltage necessary to meet track speed even if over 800V. Therefore, with the use of a power manager, higher voltages from different sources can be regulated onto the DC bus. To do this, the manager module must consider power and traction, either as part of the same module, or as distinct submodules (a power module and a traction module) in communication with each other. For example, the traction manager may expect a substantially constant voltage regulated onto the DC bus by the power manager. This constant voltage may be provided to DC choppers or inverters, which further regulate the voltage into the traction motors. In one embodiment, each traction motor contains one DC chopper or AC inverter and can operate independently from the other traction motors based on individual feedback from the traction motor to the chopper or inverter. This may permit individual axle control, for example in the event of a wheel slip or motor or equipment failure (e.g. axle, bearing, etc.).

Figure 3:
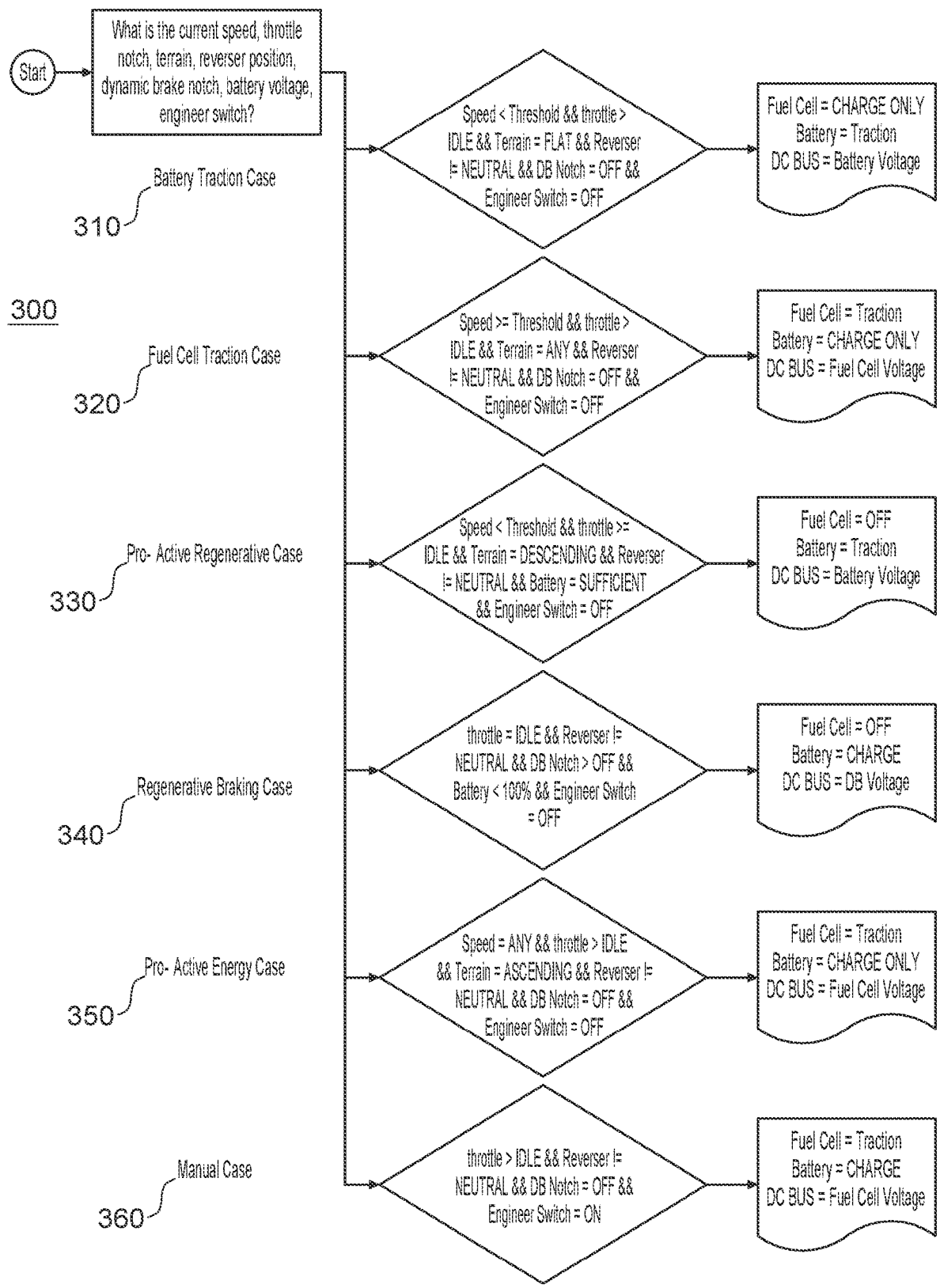
FIG. 3 is a flow diagram illustrating a control system based on power manager inputs of a locomotive, according to one embodiment.

If the power manager determines to increase or decrease (i.e., change) the DC bus voltage, this may be done based on a time constant and/or slew rate (i.e., gradually). The power manager may provide enough time for the choppers or inverters to adjust to the changing DC bus voltage, and therefore the voltage may be changed gradually. Sudden changes in DC bus voltage can cause undesirable motor control, and potentially failure. As noted above, the DC bus voltage may be varied, for example, based on locomotive state, using speed as the primary input. A flowchart outlining the control system process 300 is shown in FIG. 3.

Space/Weight Saving Options

While larger components such as larger batteries are required for higher voltage demands, reductions in system space and weight should be pursued where possible to permit hydrogen storage to be maximized and to permit the entire system to be supported on the locomotive. Maximizing hydrogen storage is beneficial for many reasons. Without sufficient space for hydrogen storage, the locomotive might not have sufficient autonomy to be practically used and implemented in terminal and/or over-the-road applications. Further, it is useful to have the entire system supported on the locomotive to mitigate and/or eliminate any requirement to use a hydrogen or battery tender. Tenders are vehicles (railcars) historically used to hold coal and water in steam operations. These tender vehicles were required in order to add sufficient self-contained range to the locomotives for operations over practical distances. Operating with tenders requires additional investment and operational delays when building trains in terminal by increasing switching. The tender vehicles also require maintenance. It is undesirable for the industry to return to using tenders. This design maximizes hydrogen storage and battery space on the locomotive's frame. The present locomotive may allow sufficient energy density to be stored and managed to provide reasonable operating ranges of these line-haul and switcher locomotives without the need for a tender. To further improve the operation, one or more of portable fueling facilities, multi-unit hydrogen locomotive consists, and hydrogen/diesel hybrid locomotive consists can be used to extend range.

The use of liquid cooling can offer a space saving. Fuel cells, batteries, DC/DC converters, chokes, and other components, may be liquid-cooled, enabling them to occupy a smaller volume of space.

In existing diesel locomotives, power electronics may be air-cooled, which may cause them to be heavier and occupy a larger volume of space. Using liquid-cooled power electronic components significantly reduces on-board space requirements for same over air cooled components. The on-board space that is freed up may be used for hydrogen storage and/or batteries.

The locomotive may use water or glycol for coolant. A cooling system using glycol may be advantageous because such a configuration could permit the cooling system to be turned off when it is not needed, such as when the locomotive is not in service, which can save significant amount of power (e.g., hydrogen). Water-based cooling systems often require continuous operation to avoid coolant freezing and thus disadvantageously consume more fuel during winter months. The cooling system may be sealed.

Therefore, the cooling system for the engine compartment of the diesel locomotive may be replaced/upgraded as part of a retrofit. Legacy radiator grids and/or radiator fans may be removed and replaced with liquid, for example glycol cooling systems, as part of a retrofit. This saved space may permit more volume on the platform for hydrogen storage and/or batteries.

The traction motors may be air-cooled, i.e., cooled by means other than the cooling system.

Other space and weight savings can be realized by using smaller, standard electrical components, such as electrical components rated for power systems of less than 800V. For example, one or more of the fuel cells, batteries, DC/DC converters, choppers, inverters, chokes, fuses, and the PLC, are not necessarily high voltage/locomotive-specific. Such components may be "off-the-shelf", but integrated into the locomotive. In addition to volume reductions and space and weight savings, using general purpose electrical components with a power manager to regulate bus voltage enables rapid and reliable conversion of locomotives. The use of lower rated, space saving electrical components may be applicable to line-haul (freight) and switching train locomotives, among other possible applications. As weight will generally be more stable, there is no need for ballast systems or ballast management typically used in locomotives known in the art.

Load components that may be lower power rated can be, for example, the DC/DC converters, AC inverters, and/or traction motor choppers. Each load component may have a capacitance, e.g., by including a capacitor, which may draw current to charge. As the number of components connected to the common DC bus increases, the total capacitance of the system increases. As a consequence, the current draw between the common DC bus and the energy generating components (e.g., fuel cells and batteries) increases. Applying full power from these energy generating components directly to the common DC bus without a pre-charge circuit can give rise to hazards and other disadvantages, for example, overcurrent-related damage, arcing, or even a fire. However, providing protection against inrush current can be expensive, consume a lot of space, require cooling and complicate the locomotive retrofit. Protection against inrush current, while minimizing the components required is of interest.

Figure 9:
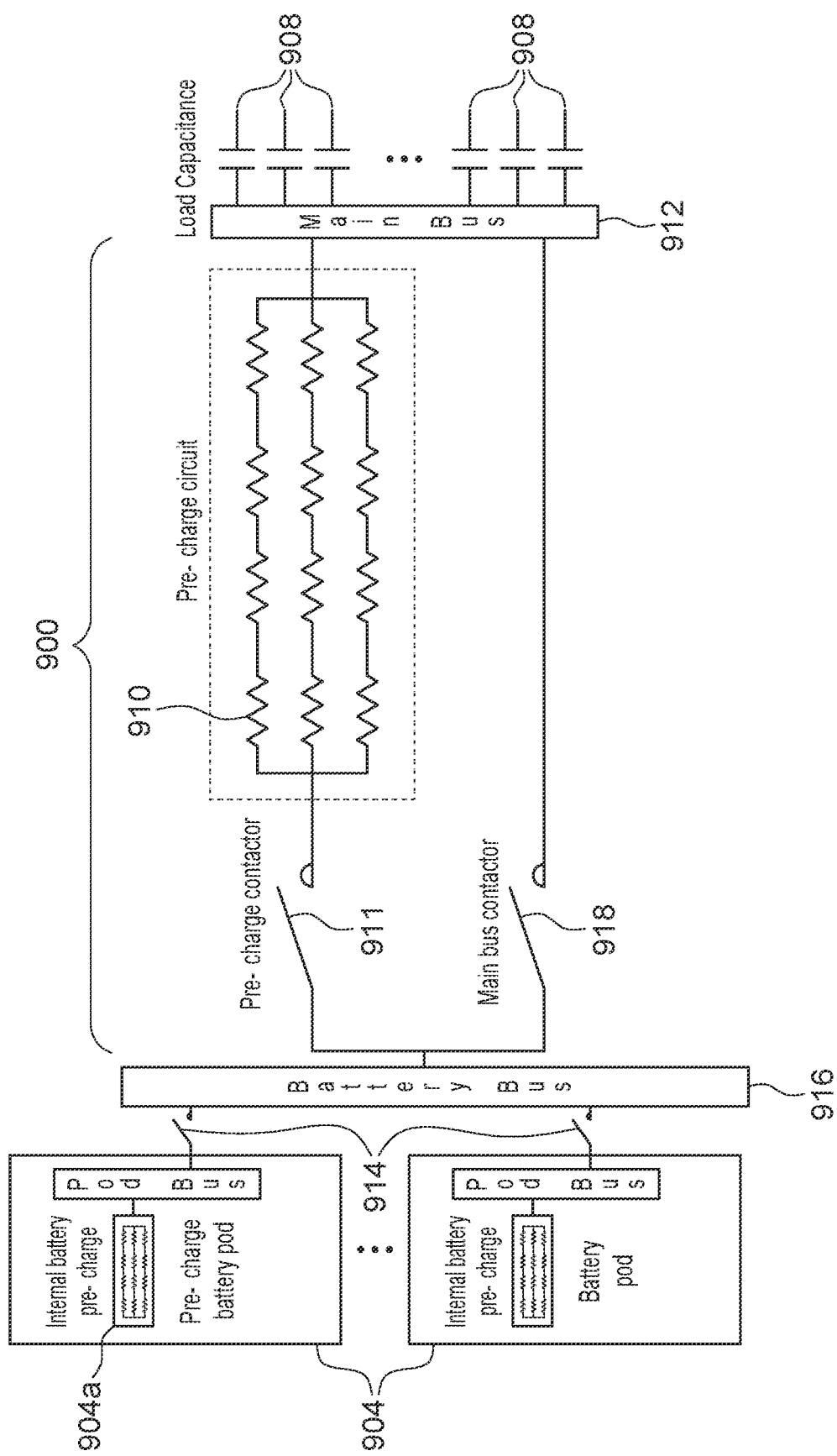
FIG. 9 is schematic of an example pre-charge circuit; and (j)

With reference to FIG. 9, for example, a pre-charge circuit 900 may be provided between the power supply, such as battery pods 904 and the one or more lower rated, "off the shelf" electrical components 908. The circuit 900 may include a plurality of resistors 910 in series-parallel combinations, as shown, and a pre-charge contactor 911. The circuit 900, specifically the resistors 910, may be sized to absorb an initial current draw from the capacitive load components 908 as the common DC bus 912 is being charged. The pre-charge circuit also includes a second contactor, which may be referred to as the main bus contactor 918, disposed between the battery bus 916 and the common DC bus 912. The main bus contactor is parallel to the resistors 910 and pre-charge contactor 911.

It is noted that while FIG. 9 illustrates the more typical configuration where there are a plurality of batteries in a plurality of pods, it is intended that this description also be applicable to a configuration where there is only one battery pod and/or where the batteries are separate, not connected in a pod.

In one embodiment, the batteries or battery pods 904 may each include an internal pre-charge circuit 904a. In such an embodiment, the pre-charge circuit 900 is in addition to any battery pre-charge circuits 904a, as battery pre-charge circuits cannot generally handle the loads of the other components.

For each pod, there may be a pod-bus contactor 914 between the pod 904 and a battery bus 916. It is noted that while FIG. 9 illustrates a configuration with the battery bus, the pre-charge circuit 900 could be installed directly between a power supply (i.e. a battery) and the common DC bus, as shown in FIG. 1.

With reference to FIG. 9, in one embodiment, the system with pre-charge circuit 900 may be operated according to the following method.

At start up, if the batteries include a circuit 904a, the batteries may run through a battery-specific pre-charge operation.

Further at start-up, after the battery pre-charge if any, the pre-charge circuit 900 may be activated by closing the pre-charge contactor 911, while main bus contactor 918 remains open. At the same time, power may be applied to the circuit 900. For example, the pod-bus contactor 914 may be closed between the batteries in a first pod and the battery bus 916. This enables power to flow from the batteries onto the battery bus 916 to charge it. From the battery bus 916, the power flows through resistors 910 onto the common DC bus 912. This circuit configuration, with power flowing through contactor 911 and resistors 910, is maintained for a set amount of time (e.g., 1-10 seconds, such as 5 seconds) to permit the common DC bus 912 to be charged.

After the set amount of time, the pre-charge contactor 911 may then open, and the main bus contactor 918 may close between the battery bus 916 and the common DC bus 912. This enables power to flow from the battery bus 916 to the common DC bus 912. It is noted that FIG. 9 illustrates the pre-charge contactor and the main bus contactor sharing a connection to the battery bus. It is to be understood that the pre-charge contactor and the main bus contactor may be coupled to the battery bus via separate contacts or any number of other circuit configurations.

After the initial pre-charge routine, the capacitances of all of the loads 908 have been charged and the pre-charge routine is not needed again during that operation of the locomotive.

The prior method can be operated and controlled by a PLC, if desired. A battery-specific pre-charge operation, if any, may be controlled by a battery pod or battery string manager or the PLC.

Some components 908 may include their own internal pre-charge circuits. Any such load component pre-charge circuit is not generally useful at the power supply voltages required for a locomotive system. Even so, the present embodiment of FIG. 9 offers a benefit of space and cost savings over such load component pre-charge circuits by operating with fewer than one pre-charge circuit for each load component, for example, possibly only one pre-charge circuit between the batteries and the common bus 912 that is sized to accommodate all components attached to the common DC bus. This means fewer and possibly only one pre-charge circuit may be connected between the batteries and the common DC bus 912 and those fewer and possibly only one pre-charge circuits may therefore act for the combined load components 908.

In some higher voltage embodiments, power management is beneficial along with the pre-charge circuit in order to manage power conducted to the common DC bus 912. For example, the use of fewer than one pre-charge circuit for each load component in the locomotive system, can be facilitated by managing the transfer of power to the common DC bus 912. In particular, the pre-charge circuit can be selected to be sufficient to handle the entire expected capacitive load on common DC bus 912 and the system can be configured such that only an amount of power capable of being handled by the selected pre-charge circuit is initially communicated to the circuit 900. This amount of power may only be a portion of the total power, such as total battery and/or fuel cell power, available on the locomotive and only a portion of the power actually needed for continuing operation of the locomotive after start up. This process to ensure that only an amount of power sufficient to pre-charge the common DC bus 912 is applied to the pre-charge circuit 900, can be achieved by configuring the circuits such that only a particular maximum voltage can be applied to the pre-charge circuit 900 (FIG. 1) and/or by controlling the system such that only an amount of power capable of being handled by the pre-charge circuit can be communicated to the pre-charge circuit 900 (FIG. 9), on start up. In one embodiment, a base load of 900V is sufficient to pre-charge the common DC bus and the pre-charge circuit is rated for accommodating voltages of at least 900V. Further, the system is configured such that a power source, such as battery pod 904, of up to 900V is wired and/or controlled to be initially communicated to the circuit 900 for pre-charge.

In such an embodiment where only a particular maximum power is initially conducted through the pre-charge circuit, after the initial pre-charge routine, any or all other power sources, such as other batteries, battery pods and/or fuel cells, may then be activated as needed. As noted above, after an initial pre-charge through circuit 900, the pre-charge routine is not needed again during operation of the locomotive. Therefore, the pre-charge process is not repeated each time an additional power supply is activated.

As noted above, the configuration supporting the use of a small number of pre-charge circuits by ensuring that only an amount of power sufficient to pre-charge the common DC bus is applied to the pre-charge circuit, can be achieved by controlling the system such that only an amount of power capable of being handled by the pre-charge circuit is communicated to the pre-charge circuit on start up. Start up sequencing of power supply components may be useful in this regard. For example, using the PLC, the sequence of power supply activation may be controlled.

In one embodiment, the first power supply component to be activated in the sequence is the portion of the power supply, such as one battery pod 904, appropriate for the rating of the pre-charge circuit 900 and sufficient to pre-charge the common DC bus 912. This gives power stability to the common DC bus.

While the foregoing focuses on the initial portion of the power supply coming from batteries, it could be supplied from a fuel cell. In particular, one or more fuel cells could be used in place of or along with pod 904 to charge the common DC bus using a similar pre-charge routine as described above. However, this would not be a typical approach. In particular, fuel cells, once activated, require an electrical load (i.e. power draw) to continue operating. Thus, if a fuel cell is used and once the common DC bus is pre-charged, unless there is a load, such as for example the locomotive is activated in traction or the cooling system is activated, the fuel cells may shut down and the process of pre-charging may be needed again to restart the locomotive.

Generally, for example, a minimum load of approximately 30 kW, for example, is required or beneficial for sustained fuel cell operation. This load may be disadvantageously substantial, requiring significant power and hydrogen to be wasted as the locomotive is operated. Batteries may be, therefore, the preferred components to activate first and to power the pre-charge, in order to save power. Although batteries may have cooling, they can be operated without cooling or any additional constant load source. The PLC may monitor battery temperature, and may be configured to activate the cooling system when temperatures sensed via a thermostat exceed pre-set ranges, e.g., 22-27 degrees C., such as 25 degrees C. If the operator and/or locomotive is stationary during start-up and/or operation, power and hydrogen can be saved by activating the batteries first, extending the range of the locomotive. Fuel cells can be operated as required, after start up, to provide additional power, for example to maintain a state of charge in the batteries.

In addition to the problem of the fuel cell requiring a minimum load to remain activated, starting a fuel cell rapidly may damage the electrolysis membrane. In particular, a fuel cell typically requires a minimum load of 30 KW per fuel cell to ensure the reaction in the fuel cell is adequately lubricating a membrane of the fuel cell. The fuel cell must generate enough water to keep the membrane moist. If the fuel cell is activated before one of the batteries, it is difficult to generate sufficient water to lubricate the membrane.

A fuel cell may be configured to monitor hydrogen and/or oxygen inlet flow and/or pressure. The flow and/or pressure demands of fuel cell consumables may depend on the required power output of the fuel cell. The power output may depend on the electrical load. A minimum load, for example, of 30 kW, may be required or beneficial in order to ensure a proper electrochemical reaction occurs through a membrane of the fuel cell. In operation, a reaction occurs between hydrogen and oxygen in the fuel cell, generating water. The water may act as a lubricant for the fuel cell which protects it, and may prolong its useful life. "Starving" may refer to a reaction within the membrane of the fuel cell with inadequate oxygen and/or hydrogen, which can be caused by insufficient electrical load on the fuel cell. The fuel cells may be configured to monitor starvation conditions, e.g., by monitoring one or more of the electrical load, the flow and/or the pressure of hydrogen and/or oxygen in the fuel cell. When a starvation condition is sensed, the fuel cell may be configured to shut down. Shut down procedures, i.e., deactivating the fuel cell in the event of over-charge, are intended to protect the fuel cell, but do not necessarily prevent all damage. Accordingly, it may be advantageous to activate one or more of the batteries before any fuel cells are operated.

Therefore, the PLC may control the system such that a portion of the battery power supply is activated first. This portion is selected to provide an appropriate voltage according to the base capacitive load of the common DC bus 912 and the rating of the pre-charge circuit 900, to pre-charge the common DC bus. Then, other components may be activated such as further batteries and/or one or more fuel cells. In fact, the PLC may control the system such that the fuel cells may only be activated after one or more of the batteries is activated. Fuel cells can be operated as required to maintain a state of charge in the batteries or for additional power in certain circumstances (FIG. 3). The present power management PLC system can also stop operation of the fuel cells to avoid fuel cell starvation and to prevent battery over-charge. The embodiment which is configured to sequence activation of various power supply components, can support the use of minimal, such as only one "off the shelf" (i.e., less than 900V) rated, pre-charge circuit between the power supply and the common DC bus. The system can also mitigate damage to the fuel cell system by sequencing activation of the power supply components during start up and operation of the locomotive.

In embodiments with multiple batteries/pods, at least one battery pod can be set up to provide the portion of power required for the pre-charge routine. Therefore, only one battery/pod need be activated before any fuel cells to provide power stability to the common DC bus.

Ongoing Maintenance of Locomotive

Fully integrated components (e.g., fuel cells) may enable one or many tiers of maintenance. Tier 1 may be able to work on only existing locomotive components. Tier 2 may be able to remove/install fuel cell, battery or other assemblies. Tier 3 may be able to rebuild/refurbish removed assemblies in additional to performing all Tier 1, 2 maintenance activities.

Examples

Examples of possible utility, which may be characterized as advantages of the instant invention compared to the prior art, are summarized in the table below.

| Parameter | Instant invention | Prior art |
| --- | --- | --- |
| B2B | Not Required - key locations using GPS can be programed/updated in an onboard configuration, consist and tonnage can be inputted but are not necessary, track profile is not necessary but this information can be defined in key locations (i.e. descending grade, ascending grade based on directional input), optimization based on current locomotive manager conditions and key optimization points. Optimization reduces need for tender. | Required-Uses GPS, consist, train ID, tonnage, track profile to optimize entire route requiring railway company back office data. Does not utilize fuel level/reserves, speed, predefined points to optimize range. |
| Route Optimization | Design optimizes range based on, e.g., H2 reserves, speed, proximity to regenerative locations, current battery levels, operator switch override | Optimizes entire route and does not use fuel level with regards to battery charge state |
| Track Profile | Not Required | Required |
| Train Consist | Optional | Required |
| Fuel Optimization | Hydrogen/Batteries | Diesel/Batteries |
| Automated Mode | No-Power distribution for locomotive manager does not require automatic operation | Yes-Automates all operator functions |
| Available from 0 MPH | Yes and real-time automatically activated all the time | No-Requires above 7 MPH to activate and requires operator to activate. Not active all the time. |
| Stretch Range | Yes-May sacrifice speed to stretch range based on on-board logic. | No-Does account for current fuel levels or sacrifice speed. Uses track speed and must always attempt to meet track speed. |
| Operator can update/adjust configuration | Yes | No |
| Optimization requirement | Avoid tender and H$_2$ depletion | Save Diesel Fuel |

Small Scale Hydrogen Production

Figure 7:
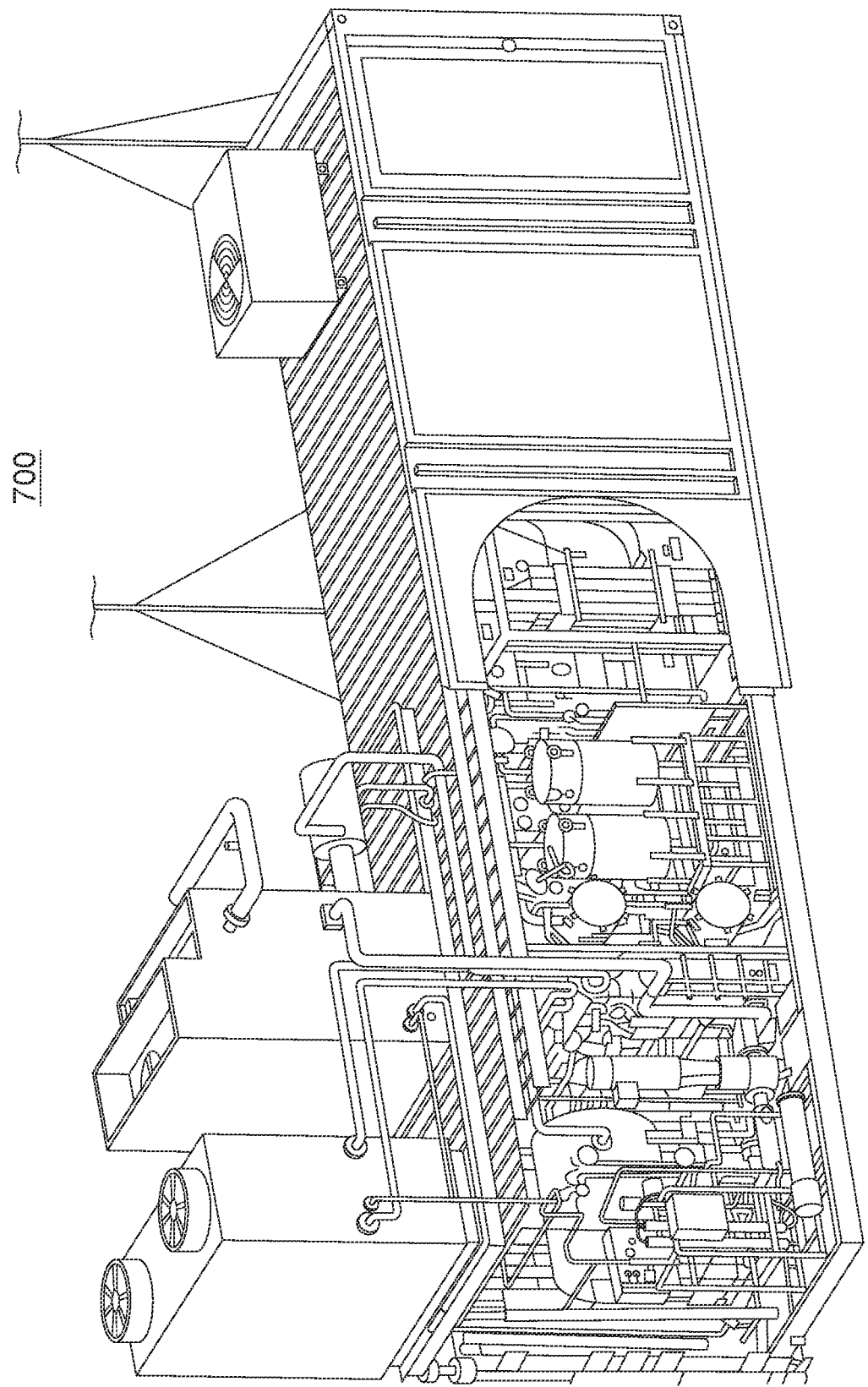
FIG. 7 is a top perspective view of an electrolyzer at a relatively small-scale, portable hydrogen production facility, according to one embodiment.

Hydrogen production facilities may be provided, which may be characterized as small-scale hydrogen production facilities. In one embodiment, the facility may use an electrolyzer 700 (see FIG. 7) and/or a steam methane reforming (SMR) apparatus and/or method to generate hydrogen. Electrolyzers may generate hydrogen by passing electricity through water. SMR apparatus may separate hydrogen from natural gas. Each has production benefits, and depending on geographic location may be more advantageous. For example, in Alberta, Canada, SMR plants may be preferred due to the abundance of natural gas and oil and gas experience in the local economy. In contrast, in Quebec, it may be more favorable to use an electrolyzer to generate green hydrogen, on account of the ready availability of hydro-electric power used in the region.

Figure 8:
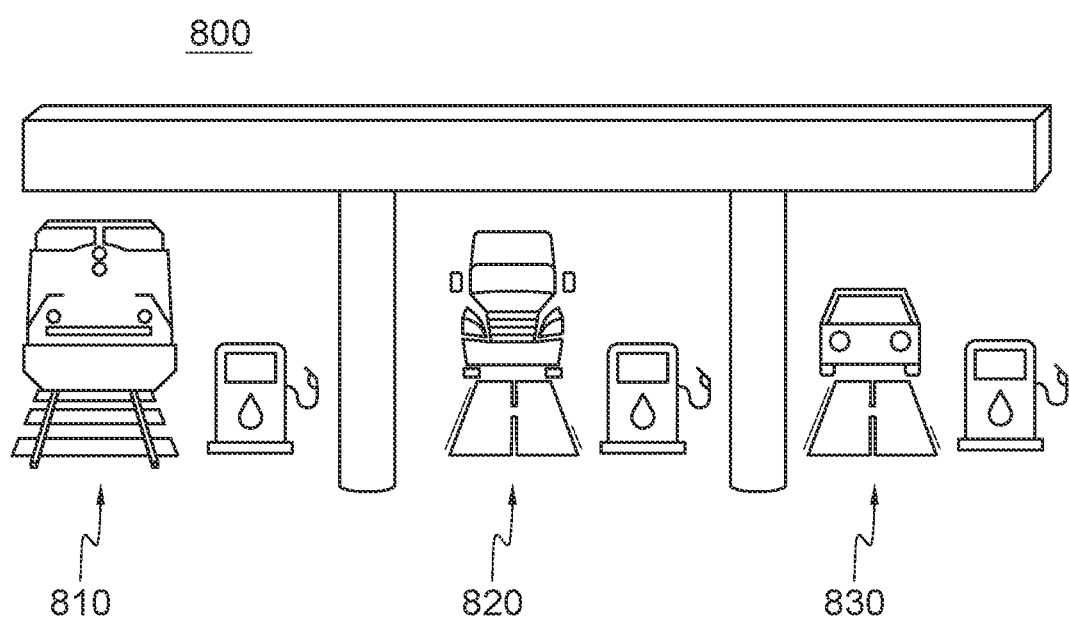
FIG. 8 is a schematic of a multi-modal, off-taker facility, according to one embodiment.

With reference to FIG. 8, one or more of these facilities 800 may be strategically disposed in rail terminals or along rail ways, which may be, for example, located in major cities across North America. The amount of hydrogen produced at the facility, in addition to serving rail markets 810, may also serve domestic trucking markets 820 (middle) and automotive markets 830 (right) as supplemental consumers of hydrogen and/or electricity generated from hydrogen.

Hydrogen is useful for locomotive operations because refueling times are comparable to those of diesel-based embodiments. Currently, battery-only locomotives require significant recharging times within a 24-hour period. Charging infrastructure is generally located in a fixed location, whereas hydrogen generated near a railway can be transported direct-to-locomotive (DTL). Therefore, portable small-scale hydrogen production facilities can be deployed at convenient locations across the rail network to support feasible transition to low- or zero-emission locomotives. In one embodiment, small-scale hydrogen production facilities can be installed on rail car chassis and moved along rail lines to a locomotive for refueling.

Railway System for Use by Locomotives Powered by Electricity from a Hydrogen Fuel Cell A system may be provided to support the operation of a hydrogen-battery, hybrid locomotive operation through the placement of small-scale hydrogen production facilities in urban railyards enabling multiple off-takers (e.g., trucking, automotive, and/or marine) and/or direct-to-locomotive fueling capability. Small-scale hydrogen production facilities can generate hydrogen from electrolysis, steam methane reforming, or other apparatus and methods, optionally based on the most efficient and lowest environmental impact power generation source of the region (e.g., state, province, municipality, country).

A railway system for use by locomotives powered by electricity from a hydrogen fuel cell may include a plurality of hydrogen-generation stations deployed near a track of the railway system positioned at locations that are accessible by the locomotives, for refueling of the locomotives, where the locations are optimized for station inputs and optimal operation expected of the hydrogen fueled locomotives. For example, locations may be optimized based on duty cycles and routing of fleets. Other factors may include the presence of a tender on a given locomotive to hold additional hydrogen, availability of renewable electricity (e.g., a solar farm), cost of electricity, natural gas availability, interchange locations with other railways, and/or natural work locations (e.g., set outs and lifts) for trains at specific terminals, to name a few. Major terminals may be candidates that could service both switcher and road locomotives, and have a flow of trucks. Mining locations could also be used, which may have the additional advantage of supplying power for heavy mining equipment. Other applications could include marine, heavy mining trucks, and military apparatus.

The hydrogen-generation stations may include one or more of an electrolysis apparatus and a steam methane reformer apparatus, for use as locomotive fuel for fuel cell production of electricity. A surplus of hydrogen generated by the hydrogen-generation stations may be stored in a pressure vessel. A surplus of electricity generated from hydrogen by the hydrogen-generation stations may be stored in a battery. A surplus of hydrogen generated by the hydrogen-generation stations may be delivered to hydrogen-powered road vehicles.

The previous description of the disclosed embodiments is provided to enable any person skilled in the art to make or use the present invention. Various modifications to those embodiments will be readily apparent to those skilled in the art, and the generic principles defined herein may be applied to other embodiments without departing from the spirit or scope of the invention. Thus, the present invention is not intended to be limited to the embodiments shown herein, but is to be accorded the full scope consistent with the claims, wherein reference to an element in the singular, such as by use of the article "a" or "an" is not intended to mean "one and only one" unless specifically so stated, but rather "one or more". All structural and functional equivalents to the elements of the various embodiments described throughout the disclosure that are known or later come to be known to those of ordinary skill in the art are intended to be encompassed by the elements of the claims. Moreover, nothing disclosed herein is intended to be dedicated to the public regardless of whether such disclosure is explicitly recited in the claims. No claim element is to be construed under the provisions of 35 USC 112, sixth paragraph, unless the element is expressly recited using the phrase "means for" or "step for".

The invention claimed is:

1. A locomotive, comprising:
a traction motor for a wheel set of the locomotive;
one or more power sources for powering the traction motor, including a hydrogen fuel cell, and a battery,
the motor being operatively connected to a DC chopper of a set of independent DC choppers, the DC chopper being configured to regulate power to the traction motor;
the DC chopper and each other DC chopper in the set of independent DC choppers being linked via a common DC bus, the bus connecting the one or more power sources to each DC chopper;
a battery pre-charge circuit for the battery, the battery pre-charge circuit configured for mitigating risks associated with overcurrent-related damage;
a pre-charge circuit between the battery and the common DC bus, the pre-charge circuit configured for mitigating risks associated with overcurrent-related damage;
a converter for regulating a voltage of the bus;
a user interface for communication with an operator; and
a manager module, including a processor, configured to:
receive an input from the user interface and send signals thereto;
control the converter; and
coordinate delivery of electricity from the one or more power sources to the motor, including
determining an amount of power delivered by each of the one or more power sources, and deciding which power source to use as a single source or multiple source, based on one or more inputs, including available power of each source.

2. The locomotive of claim 1, further comprising:
a temperature control system for cooling one or more of: the one or more power sources, the one or more DC choppers, electronic components, DC/DC converter, and chokes.

3. The locomotive of claim 2, wherein:
the temperature control system is further configured to cool one or more of: the power source, the one or more DC choppers or AC inverters, electronic components, DC/DC converter, and chokes and thereby permit volumetrically smaller versions of same to preserve space in the locomotive.

4. The locomotive of claim 1, wherein the traction motor is a DC motor.

5. The locomotive of claim 1, wherein the traction motor is an AC motor.

6. The locomotive of claim 5 wherein power from the common DC bus is converted to AC using an inverter or other DC to AC converter.

7. The locomotive of claim 1, further comprising one or more of: a DC/DC converters, an inverter, a chopper, a contact, a fuse, and a breaker to regulate and tune power based on component specifications and limitations, which may include one or more of nominal voltage, nominal current, peak voltage, peak current, operating temperature range, size, volume, and/or communication protocol, and/or in response to a control signal from the manager module, the operator via the user interface, or a combination thereof.

8. The locomotive of claim 1, further comprising:
a second traction motor, wherein each of the traction motors is regulated by a dedicated chopper of the set of independent DC choppers or AC inverters via the manager module;
the manager module further configured to
individually control each of at least two axles of the locomotive;
suspend one or more of the traction motors in the event of a sensed failure, thereby permitting the locomotive to continue to function despite the failure.

9. The locomotive of claim 8, wherein the sensed failure includes a sensed electrical failure sensed by current and voltage sensors on the traction motors configured to sense anomalous changes to voltage and/or current drawn by the motors.

10. The locomotive of claim 8, wherein the sensed failure includes a sensed wheel slip.

11. The locomotive of claim 8, wherein the sensed failure includes a hydrogen leak sensed by a hydrogen leak sensor.

12. The locomotive of claim 8, wherein the sensed failure includes a fire event sensed by a flash sensor.

13. The locomotive of claim 1, wherein:
the manager module further comprises a programmable logic controller (PLC), the PLC configured to receive a control input including at least one of: a reverse position signal, a throttle notch signal, a dynamic brake notch signal, and a speed signal; and
determining the amount of power delivered by each of the one or more power sources is informed by the control input, wherein
a speed signal indicating a speed above a threshold, such as 40 mph, causes the manager module to increase voltage delivered by the one or more power sources, and
a speed signal indicating a speed below the threshold causes the manager module to decrease voltage delivered by the power sources to nominal levels supported by the battery strings.

14. The locomotive of claim 1, wherein the one or more power sources includes a regenerative braking apparatus and the manager module is further configured to modulate regenerative braking based on one or more of a speed, a consist, a wheel slippage indicator, a track profile, and an operator signal.

15. The locomotive of claim 1, wherein:
the one or more power sources include a regenerative braking apparatus;
the manager module has an elevation datum, a grade datum, a location datum, and a destination datum; and
the manager module is further configured to determine whether the locomotive has sufficient power available in each of the one or more power sources based on the elevation datum, the grade datum, the location datum, and the destination datum, wherein
if the grade datum indicates a downward slope, the manager module causes greater consumption of power of the regenerative braking apparatus relative to the hydrogen fuel cell; and
if the grade datum does not indicate the downward slope and if the battery has sufficient power to travel to a location of the location datum, the manager module causes greater consumption of power of the battery relative to the hydrogen fuel cell;
thereby optimizing consumption of stored hydrogen by the hydrogen fuel cell.

16. The locomotive of claim 1, wherein:
the manager module has a fuel savings locations data set comprising track slope data; and
the manager module is further configured to coordinate delivery of electricity based on proximity to a fuel savings location calculated based on the fuel savings locations data set and a location of the locomotive, wherein a speed of the locomotive may be reduced to increase range.

17. The locomotive of claim 1, wherein the manager module is further configured to implement a learning algorithm to optimize power consumption based on past trip data including one or more of location, distance travelled, track profile, operator preference, consist, minimum speed, time, and power consumed by each of the power sources; and wherein the manager module updates the past trip data after a trip using measurements obtained during the trip.

18. The locomotive of claim 1, wherein:
the one or more power sources include a regenerative braking apparatus;
the manager module is further configured to coordinate delivery of electricity by
determining whether the locomotive is approaching a downward slope, and in the affirmative, increasing consumption of power of the regenerative braking apparatus relative to the other power sources;
determining whether the locomotive is on a downward slope, and in the affirmative, charging the battery via the regenerative braking apparatus relative to the other power sources;
determining whether the locomotive is approaching an upward slope, and in the affirmative, increasing consumption of power of the hydrogen fuel cell and the battery relative to the other power sources;
determining whether the locomotive is travelling at a low to medium cruising speed of below a threshold, such as 40 mph, and in the affirmative, increasing consumption of power of the battery and using the hydrogen fuel cell to charge the battery; and
determining whether the locomotive is travelling at a high cruising speed above the threshold, and in the affirmative, increasing consumption of power of the battery and using the hydrogen fuel cell to charge the battery; and
wherein the manager module is further configured to listen for a manual override signal via the user interface, and if the signal is received, the manager module will increase consumption of power of the fuel cell notwithstanding determinations based on slope and speed.

19. The locomotive of claim 1, further comprising:
electrical components, such as one or more of DC/DC converters, fuel cells, traction motor choppers, chokes, pumps, breakers, fuses and batteries, which support voltages of up to 800V.

20. The locomotive of claim 19, wherein:
the electrical components are liquid-cooled to accommodate volume constraints of the locomotive.

21. The locomotive of claim 19, further comprising:
a pre-charge circuit for the electrical components, the pre-charge circuit including a resistor grid, wherein power from the one or more power sources passes through the pre-charge circuit before the power is delivered to the one or more electrical components such that current draw can be controlled, thereby avoiding overcurrent-related damage to the given component.

22. The locomotive of claim 21, wherein the manager module is configured to communicate a selected maximum power supply through the pre-charge circuit onto the common DC bus and, thereafter, the manager module is further configured to bypass the pre-charge circuit to sequence further of the one or more power sources onto the common DC bus to apply power to the common DC bus in excess of the maximum power supply.

23. The locomotive of claim 22, wherein the selected maximum power supply is a battery string with a power output of less than 900V and the manager module is configured to connect the fuel cell onto the common DC bus after the battery string.

24. The locomotive of claim 1, further comprising fiber optic cables connecting one or more of the various components.

* * * * *